Sept. 29, 1942.  H. R. PARMAN  2,297,191
ILLUMINATED STAND
Filed May 18, 1940

Patented Sept. 29, 1942

2,297,191

UNITED STATES PATENT OFFICE 2,297,191

ILLUMINATED STAND

Howard R. Parman, Chicago, Ill., assignor to Chamberlain, Inc., Chicago, Ill., a corporation of Illinois Application May 18, 1940, Serial No. 335,909

4 Claims. (Cl. 248—44)

This invention relates to illuminated stands in general and particularly to ornamental illuminated stands or supports for Christmas trees.

The primary object of the present invention is the provision of a one-piece cast or molded translucent or transparent relatively dome-shaped hollow member, having its outer surface jagged, irregular or lumpy to simulate or imitate blocks or pieces of ice, icicles, snow and the like, the said member being removably mounted on a base carrying colored electric lights, the rays from which reflect through the member to give it variable colors.

Another important object of the present invention is the provision of a Christmas tree stand and holder which has a one-piece dome-shaped molded body member made of translucent or transparent material, preferably glass, adapted to be removably mounted on a base member which is electrically equipped with electric light globes, the light from which is adapted to shine through the dome-shaped glass member to provide a color effect.

A further object of the invention is the provision of a Christmas tree holder or stand having new and improved means for supporting the tree, the tree being mounted in a part of the base by merely pushing the lower end or butt of the tree between springy supporting members which are secured to the base, the said base being supplied with illuminating means properly and electrically wired, whereby light from the illuminating means will shine through a translucent or transparent dome-shaped member which is removably mounted on the base.

Still another object of the invention is to provide a combined Christmas tree stand and base which is constructed and arranged to give the appearance of being made of ice or snow, or both; which is highly ornamental; which can be readily and economically manufactured; which is strong and durable in construction; and which permits a tree to be quickly and easily arranged in proper upright position and not be upset.

A still further object of the invention is the provision of a new and novel illuminated translucent or transparent dome-shaped member having an irregular or jagged outer surface which is adapted to simulate ice and snow and through which light shines from electric lamps mounted interiorly of the member.

Numerous other objects and advantages will be apparent throughout the progress of the following specification.

The accompanying drawing illustrates a selected embodiment of the invention and the views therein are as follows:

Fig. 1 is a detail elevational view of the improved illuminating stand;

Fig. 2 is a detail top plan view thereof, parts being broken away for the sake of clearness;

Fig. 3 is a transverse sectional view on the line 3—3 of Fig. 2;

Fig. 4 is a detail sectional view of a modified form of tree holder used in connection with the improved stand; and Fig. 5 is a detail sectional view on the line 5—5 of Fig. 4.

The particular stand herein shown for the purpose of illustrating the invention comprises a base 5 which may be any desired shape but which is shown herein as being octagonal. The base 5 may be cast or molded from any desirable material, or it may be a metal stamping. Openings 6 may be provided in the bottom 7 to allow for ventilation as well as to lighten the weight. Webs 8 between the openings 6 are preferably formed integral with the upstanding peripheral rim or flange 9. Short legs 10 are provided on the bottom 7 to hold the device a predetermined distance above the floor or other support upon which the stand is mounted. The webs 8 merge or meet with a central member 11, Fig. 2, which may be also an integral part of the base 5. An upstanding circular or tubular member is made integral with center 11 on the bottom 7 of the base 5, and concentric therewith, to provide a socket member 12, and leaf springs 13 are suitably mounted on the socket member 12 so as to support a Christmas tree 14, Fig. 3.

The spring members 13 have their lower ends 15 set in recesses formed in the base, and are relatively straight to be operatively fastened to the socket member. The upper ends of the springs are bent or curved outwardly, as indicated at 16, to permit the tree 14 to be inserted easily and readily in place. The tree 14 is placed in position in the socket member 12 by merely pushing the tree downwardly between the springs 13 until it extends into the socket 12 a predetermined distance. The tree may also be removed instantly from the socket by merely pulling it out. The socket member 12 may have its inside walls inclined as shown to facilitate easy insertion and removal of the tree and to insure its being centered and properly positioned. The upper ends of the springs 13 extend an appreciable distance upwardly where the bulged or curved ends engage the tree trunk to support the tree properly and effectively in place.

Fig. 3 shows the springs 13 fastened to the socket member 12 by means of screws, but in actual practice it has been found advantageous to fasten the springs in place by means of a clamping ring 17 as shown in Figs. 4 and 5. When the springs are secured in place by the clamping ring 17 the socket member 12 is elongated somewhat with its outer walls tapering slightly. Recesses 18 are formed in the outer walls, as shown in Fig. 5, to receive the ends of the springs, whereby any tendency of the springs to shift laterally is overcome. The springs 13 project a slight distance outwardly from their recesses 18 so that the clamping ring 17 may be pushed downwardly to lock the springs securely in their respective recesses. If desired, a water receptacle 19, in the form of a cup, may be inserted in the socket member 12, as shown in Fig. 3.

The base 5 may have a plurality of light sockets 20 mounted thereon to receive electric lamp globes 21. The sockets 20 are properly electrically connected to a source of electric supply to furnish electricity to the lamps 21. In order to give a certain colored effect or appearance the lamps 21 may be colored instead of clear or white, and each lamp 21 may be of a different color.

The upstanding rim or flange 9 on the base 5 is provided with a peripheral groove 23, Fig. 3, to receive the lower peripheral edge of a rim 24 on a hollow dome-shaped member 25 which is adapted to cover and conceal the base 5 and all the parts and equipment mounted thereon. The member 25 has its rim 24 of a configuration similar to the shape of the base 5 so as to be removably received in the groove 23. The rim 24 of the member 25, Fig. 2, is octagonal and merges with the upper dome-shaped, rounded or relatively spherical-shaped part 26, Fig. 1. The dome-shaped upper part 26 is irregular or rough and includes jagged and rugged relatively cube-shaped parts 27 to simulate pieces of ice. In actual practice it has been found desirable to mold the entire member 25 as a single unitary homogeneous clear glass mass. The cube-shaped parts 27 are integrally united during the molding of the member 25 and unite integrally to make a single element having the appearance of a rugged lump of ice. The rim part 24 is also made to look like ice and in this connection, fingers or projections 28 of glass extend downwardly from the glass cubes 27 to simulate icicles, Fig. 1. The entire top part 25 which includes the top part 26 and the integral connecting rim 24 is an integral unit made of a translucent or transparent material to give the appearance of being a chunk or block of ice, which when used in connection with the colored lighting arrangement gives a highly ornamental and pleasing appearance.

The top of the part 26 is provided with a concentrically arranged opening 29 in alinement with the socket member 12 and through which the tree 14 is passed. The opening 29 is large enough to accommodate tree trunks of a predetermined size and at the same time permits a space to remain between the edge of its opening and the tree trunk to allow for the passage of air. The stand therefore is ventilated to permit air to pass through the openings 6 in the base and then through the opening 29. Therefore, any heat which may be generated by the lamps 21 will pass out through the opening 29.

Moreover, the construction of the device is such that an element in the form of a shade may be rotatively supported under the dome 25 and be rotated by the heat generated by the lamps 21 to give a flickering or moving appearance. By properly configurating, perforating or coloring this shade various optical effects may be obtained, such as falling snow.

The invention provides an attractive and highly ornamental Christmas tree base support and stand simulating ice and snow. The base is properly constructed and of sufficient size and weight to support a tree and prevent it from accidently falling over or tipping. Also, the base incorporates a novel means for quickly and easily permitting a tree to be placed in position and removed. The entire device may be made in various sizes, and the construction is such that it may be readily manufactured and sold at a low price.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A Christmas tree stand comprising a relatively wide substantially flat base, a socket member integrally formed on said base and extending upwardly therefrom to receive the stem of the tree, said socket member being provided with a plurality of vertical recesses formed in the upwardly extending outer wall of the socket member, spring members for supporting the stem of the tree above the top of the socket member arranged in said recesses, a clamping ring engaging around said outer wall of the socket member over said spring members to clampingly fasten the spring members in said recesses and to the socket member, and a one piece dome-shaped glass-like member directly mounted on the base and extending over and above said socket member and said spring members to cover the socket and spring members, said last named member having an opening therein in alinement with the opening in the socket member.

2. A Christmas tree stand comprising a relatively wide substantially flat base, a socket member integrally formed on said base and extending upwardly therefrom to receive the stem of the tree, said socket member being provided with a plurality of vertical recesses formed in the upwardly extending outer wall of the socket member, said outer wall and said recesses being inclined upwardly and inwardly towards the vertical axis of the socket member to provide an outer tapering surface on the socket member, spring members for supporting the stem of the tree above the top of the socket member arranged in said recesses, a clamping ring engaging around said tapered outer surface of the socket member over said spring members for clampingly fastening the spring members in said recesses and to the socket member, a one piece dome-shaped glass-like member directly mounted on the base and extending over and above said socket member and said spring members to cover the socket and spring members, said last named member having an opening therein in alinement with the opening in the socket member, and electric lamps mounted on the base under the dome-shaped member.

3. A Christmas tree stand comprising a relatively wide substantially flat base, a socket member formed integrally with the base and extending upwardly therefrom to receive the stem of a tree, a plurality of spring members adapted to extend upwardly beyond the top of said socket member and engage and support the tree stem above the socket member, means for removably fastening said spring members on the upwardly extending outer wall of said socket member, and a one piece dome-shaped glass-like member directly mounted at its periphery on the base and extending over and above said socket member and said spring members to cover the socket and spring members, said dome member having an opening in alignment with the opening in the socket member.

4. A Christmas tree stand comprising a relatively wide substantially flat base, a socket member integrally formed on said base and extending upwardly therefrom to receive the stem of the tree, said socket member being provided with a plurality of vertical recesses formed in the upwardly extending outer wall of the socket member, spring members for supporting the stem of the tree above the top of the socket member arranged in said recesses, and a clamping ring engaging around said outer wall of the socket member over said spring members to clampingly fasten the spring members in said recesses and to the socket member.

HOWARD R. PARMAN.